United States Patent

[11] 3,631,950

| [72] | Inventor | Seiji Tanaka<br>358-43, Nukushina, Aki-cho, Aki-gun, Hiroshima, Japan |
|---|---|---|
| [21] | Appl. No. | 872,883 |
| [22] | Filed | Oct. 31, 1969 |
| [45] | Patented | Jan. 4, 1972 |
| [32] | Priority | Oct. 31, 1968 |
| [33] | | Japan |
| [31] | | 43/79793 |

[54] AUTOMATIC VEHICLE TRANSMISSION WITH LOCKUP EMERGENCY BRAKE
4 Claims, 1 Drawing Fig.

[52] U.S. Cl. .................................................. 192/4 A,
74/752 C, 192/87.12
[51] Int. Cl. .................................................. F16d 25/10
[50] Field of Search .......................................... 192/4 A, 4
C, 87.12, 87.13, 3.26, 3.27; 74/411.5, 752 C

[56] References Cited
UNITED STATES PATENTS

| 2,544,551 | 3/1951 | Black | 192/3.26 |
| 2,727,601 | 12/1955 | Shurts | 192/3.26 |
| 2,929,478 | 3/1960 | Tuck et al. | 192/87.13 X |
| 2,933,172 | 4/1960 | Fisher et al. | 192/87.13 |
| 2,936,864 | 5/1960 | Schjolin et al. | 192/87.12 X |
| 2,963,945 | 12/1960 | Barker et al. | 192/4 C X |
| 3,163,270 | 12/1964 | Zingsheim | 192/3.27 |
| 3,182,775 | 5/1965 | Schall | 192/3.27 |

Primary Examiner—Benjamin W. Wyche
Attorney—Sughrue, Rothwell, Mion, Zinn & Macpeak ABSTRACT: An automatic transmission for an automobile with an emergency brake having elements for establishing low- and high-speed gear trains is provided with a manual selector valve for selectively supplying oil pressure from an oil pump through a manual valve to the elements, said manual valve having a specific position for an emergency brake. A switching valve controlled by a governor valve is provided in the oil passage for connection between said manual valve and high-speed element, wherein when the manual valve is placed in the emergency brake position, the low-speed element is engaged to operate the engine brake, and when the vehicle speed is reduced below a predetermined speed, the switching valve is transferred by the governor valve to engage the high-speed element to lock the output shaft. This safely stops the automobile by braking the automatic transmission when the brake system is defective in the vehicle.

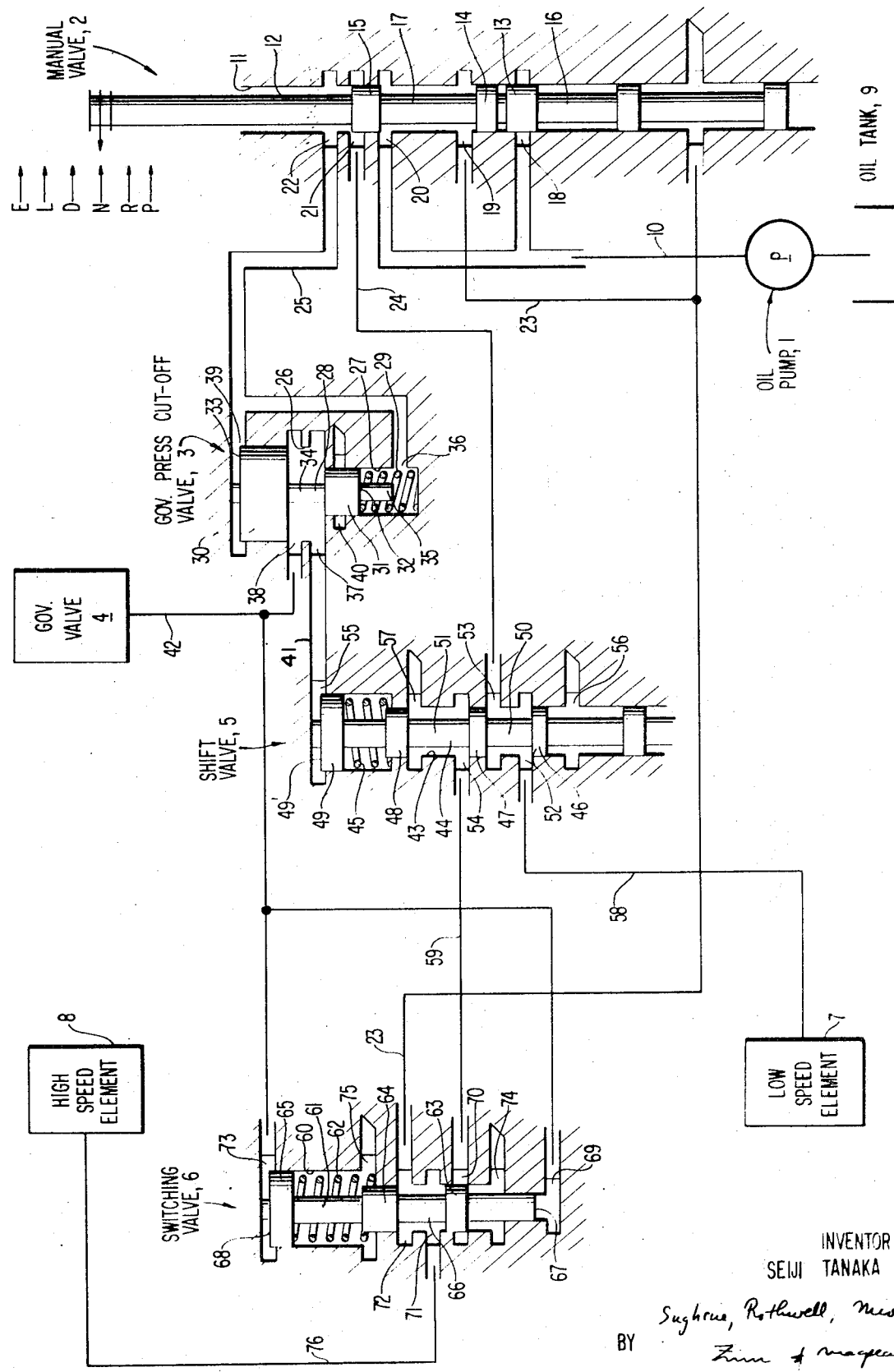

AUTOMATIC VEHICLE TRANSMISSION WITH LOCKUP EMERGENCY BRAKE

SUMMARY OF THE INVENTION

This invention relates to an automatic transmission for an automotive vehicle, and more particularly, to a control system for an automatic transmission of the type having at least two friction elements adapted to transmit the driving force from the input shaft to the output shaft through a proper reduction by using a planetary gear set and by engaging a particular element of shift elements of the planetary gear set, thereby obtaining at least two different gear ratios from the planetary gear set. A transmission of this type is well known in the art and is shown and described in U.S. Pat. No. 2,936,864 to Schjolin et al., wherein two separate hydraulically actuated friction engaging elements are used to obtain two speed ratios from a planetary gear set C.

It is one object of the present invention to provide an emergency brake which utilizes a fundamental structure of an automatic transmission in order to assure safety when the vehicle brake system is defective.

Particularly, it is an object of the invention to provide an emergency brake which locks the transmission by engaging a plurality of friction elements simultaneously, such as clutches or brakes, each of which establishes a different power train shifting ratio.

It is another object of the present invention to provide an emergency brake which establishes the low-speed power train so as to act as an engine brake when a vehicle speed is high and a manual lever is shifted to an emergency brake position, and further engages the high-speed friction element to lock the transmission so as to stop the vehicle completely when the vehicle speed is decreased to a predetermined safe speed.

The other features and advantages of the present invention will become apparent from the following description taken in conjunction with the accompanying drawings.

BRIEF DESCRIPTION OF THE DRAWINGS

The FIGURE shows a hydraulic pressure circuit diagram of an automatic transmission which is provided with an emergency brake constructed in accordance with the present invention.

DETAILED DESCRIPTION OF THE INVENTION

Reference is now made to the FIGURE, which shows one example of the present invention. The automatic transmission comprises an oil pump 1, a manual valve 2 connected with a selector lever in a driving compartment, a governor pressure cutoff valve 3, a governor valve 4, a shift valve 5, a switching valve 6, a low-speed element 7 for low-speed operation or strong engine brake, and a high-speed element 8 for high-speed operation.

In the aforementioned structure of the automatic transmission, the oil pump 1 feeds the oil from an oil tank 9 into a conduit 10. The oil pressure or line pressure from the oil pump 1 is fed to the manual valve 2 through the conduit 10. The manual valve 2 comprises a piston 12 slideably inserted into a cylinder 11 and comprises various select positions, "P," "R," "N," "D," "L," and "E," wherein "P" is parking, "R" is reverse, "N" is neutral, "D" is automatic shifting, "L" is low-speed lock or engine brake, and "E" is an emergency brake. The piston 12 incorporates lands 13, 14 and 15 and has an annular groove 16 under the land 13, and an annular groove 17 between the lands 14 and 15. Oil passage ports 18 and 20 are communicated with the conduit 10 so that the line pressure is introduced therethrough. An oil passage port 19 is communicated with a conduit 23, an oil passage port 21 is communicated with a conduit 24, and an oil passage port 22 is communicated with a conduit 25.

The governor pressure cutoff valve 3 introduces or cuts off the governor pressure acting on the shift valve 5. The cylinder of the governor pressure cutoff valve 3 comprises a large diameter portion 26 and a small diameter portion 27, and a piston 28 slideably inserted therein. The piston 28 includes lands 30 and 31 corresponding to the large diameter portion 26 and small diameter portion 27, respectively, and is urged upwardly by a spring 29. A pressure-receiving surface 32 is formed at the lower end of the piston 28 and a pressure-receiving surface 33 at the upper end thereof, wherein the pressure-receiving surface 33 is larger in area than the pressure-receiving surface 32. The piston 28 also comprises an annular groove 34 located between the lands 30 and 31, and an extension 35 under the land 31. Oil passage ports 36 and 39 are communicated with the conduit 25. An oil passage port 37 is communicated with a conduit 41, an oil passage port 38 is communicated with a conduit 42, and port 40 is an exhaust port.

The shift valve 5 comprises a piston 44 slideably located in a cylinder 43. The piston 44 is urged upwardly in the drawing by a spring 45. The piston 44 has lands 46, 47, 48 and 49 located thereon. An annular groove 50 is located between lands 46 and 47, and annular groove 51 between the lands 47 and 48. A pressure-receiving surface 49' is formed at the upper end of the land 49. The cylinder 43 has oil passage ports 52, 53, 54 and 55, and oil exhaust ports 56 and 57 in communication therewith. The oil passage port 52 is communicated with the conduit 58, oil passage port 53 is communicated with a conduit 24, oil passage port 54 is communicated with a conduit 59, and oil passage port 55 is communicated with the conduit 41.

The switching valve 6 has a piston 61 slideably located in a cylinder 60. The piston 61 is urged upwardly in the drawing by a spring 62. The piston 61 comprises lands 63, 64 and 65 with an annular groove 66 located between the lands 63 and 64. A pressure-receiving surface 67 is formed on the lower end of the piston 61, and the upper end thereof forms a pressure-receiving surface 68 which is larger in area than the pressure-receiving surface 67. Oil passage ports 69 and 73 are communicated with the conduit 42, and oil passage port 70 is communicated with the conduit 59. An oil passage port 71 is communicated with a conduit 76, oil passage port 72 is communicated with the conduit 23 and ports 74 and 75 are oil exhaust ports.

In operation of the above-described arrangement of the hydraulic pressure circuit of the automatic transmission, when the select position of the manual valve 2 is disposed in the position of "P," "R," "N," "D" "L," the hydraulic control circuit operates in the same manner as the conventional automatic transmission. The hydraulic pressure circuit of the present invention operates when the manual valve is disposed in the select position of "E."

If the vehicle is running when the manual valve 2 is disposed in the select position of "D" in high speed, the oil fed from the oil pump 1 is introduced through the conduit 10 to the oil passage port 20 of the manual valve 2 and the governor valve 4 (the conduit is not shown). If the vehicle exceeds a predetermined speed, the shift valve 5 and switching valve 6 are forced downward by the governor pressure from the governor valve 4. Accordingly, the line pressure introduced to the manual valve 2 from the conduit 10 is supplied through the oil passage port 20 of the manual valve 2 annular groove 17, oil passage port 21, conduit 24, oil passage port 53 of the shift valve 5, annular groove 51, oil passage port 54, conduit 59, oil passage port 70 of the switching valve 6, annular groove 66, oil passage port 71, conduit 76 to the high-speed element so that the high-speed element 8 is engaged. The communication between the conduits 10 and 23 is blocked by the manual valve 2.

In such a condition, if the manual valve 2 is switched to the select position of "E," the oil passage port 18 is communicated with the oil passage port 19 so that the line pressure introduced to the oil passage port 18 is introduced through the oil passage port 18, annular groove 16 and oil passage port 19 to the conduit 23. At the same time, the oil passage ports 20, 21 and 22 are communicated with each other so that the line pressure introduced to the oil passage port 20 is introduced to the conduits 24 and 25.

The line pressure introduced to the conduit 25 acts on the pressure-receiving surfaces 32 and 33 of the cutoff valve 3 so that, due to the difference of the pressure-receiving areas, the piston 28 is moved downwardly against the spring 29. The oil passage port 38 is closed by the downward movement of the piston 28 and the oil exhaust port 40 is opened. Accordingly, the governor pressure from the conduit 42 in communication with the oil passage port 38 is cut off and, at the same time, the governor pressure operating on the pressure-receiving surface 49′ of the shift valve 5 is exhausted through the conduit 41, oil passage port 37, annular groove 34 to oil exhaust port 40 so that the hydraulic force for pushing the shift valve 5 downwardly is removed. Thus, the piston 44 of the shift valve 5 is moved upwardly of the drawing by the force of the spring 45 to allow communication between the oil passage ports 52 and 53 and to communicate between the oil passage port 54 and the oil exhaust port 57. When the oil passage port 54 is communicated with the oil exhaust port 57, the line pressure in the conduit 59 is exhausted through the oil passage port 54, annular groove 51 and oil exhaust port 57 to release the high-speed element.

At the same time, the line pressure introduced into the conduit 24 is introduced though the oil passage port 53, annular groove 50, and oil passage port 52 to the conduit 58, so that the low-speed element 7 is engaged. On the other hand, the line pressure introduced through the oil passage port 18, annular groove 16, oil passage port 19 to the conduit 23 is introduced into the oil passage port 72 of the switching valve 6.

While the vehicle is running in high speed, the governor pressure generated by the governor valve 4 is high, whereby the piston 61 of the switching valve 6 is forced downwardly by the governor pressure against the spring 62, so that the oil passage ports 70 and 71 are communicated with each other. Since the oil passage between the oil passage ports 71 and 72 is closed by the land 64, the high-speed element is not operated. Accordingly, only the low-speed element is engaged above a predetermined speed, with the result being that the vehicle is reduced in speed by a strong engine brake.

In such a state, if the vehicle speed is decreased to a speed below a predetermined point, for example, below a speed of approximately 30 miles per hour, and the governor pressure falls below a predetermined pressure, the hydraulic force pushing the piston 61 of the switching valve 6 downwardly is reduced, with the result that the piston 61 slides upwardly by the force of the spring 62. When the piston 61 slides upwardly, the oil passage port 70 is closed by the land 63, and the oil passage port 71 is communicated with the oil passage port 72. Since the line pressure is supplied to the port 72 through the conduit 23, the line pressure is introduced through the oil passage port 72, annular groove 66 and oil passage port 71 to the conduit 76, with the result that the high-speed element is engaged.

Thus, both the high- and low-speed elements are engaged so that the transmission is locked, with the result that it brakes the drive wheels. It follows that when the vehicle is running in high speed, if the manual valve is disposed to the select position of "E," the line pressure acts to engage the low-speed element to actuate a strong engine brake. When the vehicle speed falls below a predetermined speed, the pressure acts on the high-speed element, with the result that the automatic transmission itself adapts to act as a brake to safely stop the vehicle in cases where the brake system of the vehicle is defective.

What is claimed is:

1. A control system for an automatic planetary gear transmission for a vehicle, said automatic transmission having a first hydraulically actuated friction element means for obtaining a low-speed gear ratio and a second hydraulically actuated friction element means for obtaining a high-speed gear ratio, said control system comprising:
   a. a hydraulic fluid pressure source;
   b. a manual valve means hydraulically connected to said fluid pressure source and having a first and a second fluid pressure outlet port for selectively distributing hydraulic fluid pressure from said fluid pressure source;
   c. said manual valve means having a first position opening said first outlet port and blocking said second outlet port to automatically obtain either of said low- and high-speed gear ratios, and a second position opening both of said first and second outlet ports to obtain an emergency braking condition in said planetary gear transmission;
   d. shift valve means having a low-speed position and a high-speed position and being hydraulically connected to said first fluid outlet port of said manual shift valve means for communicating the fluid pressure from said first fluid outlet port to said first hydraulically actuated friction element means when said shift valve means is in said low-speed position and to said second friction element means when in said high-speed position;
   e. switching valve means hydraulically connected to said second fluid pressure outlet port of said manual shift valve means, and with said second hydraulically actuated friction element, said switching valve means having a first position for communicating fluid pressure from said second fluid pressure outlet port of said manual shift valve means to said second hydraulically actuated friction element means and a second position for blocking communication between said second fluid outlet port and said second hydraulically operated friction element;
   f. governor valve means connected to said source of hydraulic fluid pressure for providing a governor pressure increasing in response to an increase of the vehicle speed, said governor pressure being communicated to said shift valve means to move said shift valve means from said low-speed position to said high-speed position at a predetermined vehicle speed;
   g. said governor pressure being simultaneously communicated to said switching valve means to hold said switching valve means in said second position when the vehicle speed is above a predetermined value;
   h. means for holding said shift valve means in said low-speed position when said manual shift valve means is in said second position, whereby when said manual shift valve means is moved to said second position when the vehicle speed is above said predetermined value, hydraulic fluid pressure is supplied only to said first hydraulically actuated friction element means to obtain said low-speed gear ratio until said vehicle speed is below said predetermined value, below which hydraulic fluid pressure is simultaneously supplied to both said first and second hydraulically actuated friction element means to lock said automatic transmission to act as an emergency brake for said vehicle.

2. A control system for an automatic planetary gear transmission for a vehicle, said automatic transmission having a first hydraulically actuated friction element means for obtaining a low-speed gear ratio and a second hydraulically actuated friction element means for obtaining a high-speed gear ratio, said control system comprising:
   a. a hydraulic fluid pressure source;
   b. a manual valve means hydraulically connected to said fluid pressure source and having a first and a second fluid pressure outlet port for selectively distributing hydraulic fluid pressure from said fluid pressure source;
   c. said manual valve means having a first position opening said first outlet port and blocking said second outlet port to automatically obtain either of said low- and high-speed gear ratios, and a second position opening both of said first and second outlet ports to obtain an emergency braking condition in said planetary gear transmission;
   d. shift valve means having a low-speed position and a high-speed position and being hydraulically connected to said first fluid outlet port of said manual shift valve means for communicating the fluid pressure from said first fluid outlet port to said first hydraulically actuated friction element means when said shift valve means is in said low-speed position and to said second friction element means when in said high-speed position;

e. switching valve means hydraulically connected to said second fluid outlet port of said manual valve means and with said shift valve means, said switching valve means having a first position communicating fluid pressure from said second fluid outlet port to said second hydraulically actuated friction element means and a second position for blocking communication between said second fluid outlet port and said second hydraulically operated friction element means and communicating fluid pressure from said shift valve means to said second hydraulically actuated friction element means;

f. governor valve means connected to said source of hydraulic fluid pressure for providing a governor pressure increasing in response to an increase of the vehicle speed, said governor pressure being communicated to said shift valve means to move said shift valve means from said low-speed position to said high-speed position at a predetermined vehicle speed;

g. said governor pressure being simultaneously communicated to said switching valve means to hold said switching valve means in said second position when the vehicle speed is above a predetermined value;

h. means for holding said shift valve means in said low-speed position when said manual shift valve means is in said second position, whereby when said manual shift valve means is moved to said second position when the vehicle speed is above said predetermined value, hydraulic fluid pressure is supplied only to said first hydraulically actuated friction element means to obtain said low-speed gear ratio until said vehicle speed is below said predetermined value, below which hydraulic fluid pressure is simultaneously supplied to both said first and second hydraulically actuated friction element means to lock said automatic transmission to act as an emergency brake for said vehicle.

3. A control system for an automatic planetary gear transmission for a vehicle, said automatic transmission having a first hydraulically actuated friction element means for obtaining a low-speed gear ratio and a second hydraulically actuated friction element means for obtaining a high-speed gear ratio, said control system comprising:

a. a hydraulic fluid pressure source;

b. a manual valve means hydraulically connected to said fluid pressure source and having a first and a second fluid pressure outlet port for selectively distributing hydraulic fluid pressure from said fluid pressure source;

c. said manual valve means having a first position opening said first outlet port and blocking said second outlet port to automatically obtain either of said low- and high-speed gear ratios, and a second position opening both of said first and second outlet ports to obtain an emergency braking condition in said planetary gear transmission;

d. shift valve means having low-speed position and a high-speed position and being hydraulically connected to said first fluid outlet port of said manual shift valve means for communicating the fluid pressure from said first fluid outlet port to said first hydraulically actuated friction element means when said shift valve means is in said low-speed position and to said second friction element means when in said high-speed position;

e. switching valve means hydraulically connected to said second fluid pressure outlet port of said manual shift valve means, and with said second hydraulically actuated friction element, said switching valve means having a first position for communicating fluid pressure from said second fluid pressure outlet port of said manual shift valve means to said second hydraulically actuated friction element means and a second position for blocking communication between said second fluid outlet port and said second hydraulically operated friction element;

f. governor valve means connected to said source of hydraulic fluid pressure for providing a governor pressure increasing in response to an increase of the vehicle speed, said governor pressure being communicated to said shift valve means to move said shift valve means from said low-speed position to said high-speed position at a predetermined vehicle speed;

g. said governor pressure being applied to said shift valve means through a governor pressure passage to shift said shift valve means from said low-speed position to said high-speed position when the vehicle speed exceeds a predetermined value;

h. cutoff valve means disposed in said governor pressure passage for blocking the application of said governor pressure to said shift valve means when said manual valve means is in said second position;

i. said governor pressure being simultaneously applied to said switching valve means to hold said switching valve means in said second position when the vehicle speed is above said predetermined value, whereby when said manual shift valve means is moved to said second position when the vehicle speed is above said predetermined value, hydraulic fluid pressure is supplied only to said first hydraulically actuated friction element means to obtain said low-speed gear ratio until said vehicle speed is below said predetermined value, below which hydraulic fluid pressure is simultaneously supplied to both said first and second hydraulically actuated friction element means to lock said automatic transmission to act as an emergency brake for said vehicle.

4. A control system for an automatic planetary gear transmission for a vehicle as claimed in claim 3, wherein said manual valve means further comprises a third fluid outlet port formed therein, said third outlet port being hydraulically connected with said cutoff valve means to apply hydraulic pressure thereto when said manual valve means is in said second position to cause said cutoff valve means to block the application of governor pressure to said shift valve means to engage said first hydraulically actuated friction element means independently of the vehicle speed.

* * * * *

UNITED STATES PATENT OFFICE
CERTIFICATE OF CORRECTION

Patent No. 3,631,950            Dated January 4, 1972

Inventor(s) Seiji Tanaka

It is certified that error appears in the above-identified patent and that said Letters Patent are hereby corrected as shown below:

Assignee    Toyo Kogyo Co., Ltd.
                      Hiroshima, JAPAN

Signed and sealed this 13th day of June 1972.

(SEAL)
Attest:

EDWARD M. FLETCHER, JR.        ROBERT GOTTSCHALK
Attesting Officer              Commissioner of Patents